United States Patent
Murofushi et al.

(10) Patent No.: US 11,244,700 B2
(45) Date of Patent: Feb. 8, 2022

(54) MAGNETIC RECORDING MEDIUM, SPUTTERING TARGET, SPUTTERING TARGET MANUFACTURING METHOD, AND MAGNETIC STORAGE APPARATUS

(71) Applicant: SHOWA DENKO K.K., Tokyo (JP)

(72) Inventors: Katsumi Murofushi, Chiba (JP); Yoshitaka Ishibashi, Chiba (JP); Takayuki Fukushima, Chiba (JP); Kazuya Niwa, Chiba (JP); Lei Zhang, Chiba (JP); Yuji Murakami, Chiba (JP); Hisato Shibata, Chiba (JP); Takehiro Yamaguchi, Chiba (JP); Chen Xu, Chiba (JP); Tetsuya Kanbe, Chiba (JP); Tomoo Shige, Chiba (JP)

(73) Assignee: SHOWA DENKO K.K., Tokyo (JP)

( * ) Notice: Subject to any disclaimer, the term of this patent is extended or adjusted under 35 U.S.C. 154(b) by 611 days.

(21) Appl. No.: 16/169,065

(22) Filed: Oct. 24, 2018

(65) Prior Publication Data
US 2019/0180782 A1 Jun. 13, 2019

(51) Int. Cl.
| G11B 5/65 | (2006.01) |
| G11B 5/72 | (2006.01) |
| G11B 5/82 | (2006.01) |
| G11B 5/851 | (2006.01) |
| C08L 61/28 | (2006.01) |

(52) U.S. Cl.
CPC ............... *G11B 5/65* (2013.01); *G11B 5/656* (2013.01); *G11B 5/72* (2013.01); *G11B 5/82* (2013.01); *C08L 61/28* (2013.01); *G11B 5/851* (2013.01)

(58) Field of Classification Search
CPC .......... G11B 5/65; G11B 5/653; G11B 5/656; G11B 5/70; G11B 5/7021; G11B 5/7022; G11B 5/7023; G11B 5/7026; G11B 5/7027

See application file for complete search history.

(56) References Cited

U.S. PATENT DOCUMENTS

2016/0267934 A1 9/2016 Furuta et al.

FOREIGN PATENT DOCUMENTS

| CN | 105874536 | 8/2016 |
| JP | H1-107316 | 4/1989 |

OTHER PUBLICATIONS

Chipara et al. (Magnetism of FePt Nanoclusters in Polyimide, Journal of Nanomaterials, vol. 2015, Article ID 584847, Mar. 2015, pp. 1-10).*

En Yang et al., "L10 FePt-oxide columnar perpendicular media with high coercivity and small grain size", Journal Of Applied Physics 104, 023904, 2008.

Li Zhang et al., "L10-ordered high coercivity (FePt)Ag—C granular thin films for perpendicular recording", Journal of Magnetism and Magnetic Materials 322 (2010) pp. 2658-2664.

* cited by examiner

*Primary Examiner* — Holly Rickman
(74) *Attorney, Agent, or Firm* — IPUSA, PLLC

(57) ABSTRACT

A magnetic recording medium includes a substrate, an underlayer provided on the substrate, and a magnetic layer provided on the underlayer and having a $L1_0$ structure and a (001) orientation. The magnetic layer has a granular structure in which an organic compound having a methylene skeleton or a methine skeleton is arranged at grain boundaries of magnetic grains.

9 Claims, 3 Drawing Sheets

| | MAGNETIC LAYER | SNR [dB] | Hc [kOe] |
|---|---|---|---|
| EI1 | 90Vol% (70mol% (52at%Fe-48at%Pt)-30mol%C)-10Vol% (Polyimide) | 6.4 | 36 |
| EI2 | 90Vol% (70mol% (52at%Fe-48at%Pt)-30mol%C)-10Vol% (Melamine Resin) | 6.2 | 35 |
| EI3 | 90Vol% (70mol% (52at%Fe-48at%Pt)-30mol%C)-10Vol% (Polyethylene) | 6.0 | 34 |
| CE1 | 70mol% (52at%Fe-48at%Pt)-30mol%C | 5.1 | 31 |
| CE2 | 70mol% (52at%Fe-48at%Pt)-30mol%SiO$_2$ | 4.8 | 28 |

FIG.4

| | MAGNETIC LAYER | SNR [dB] | Hc [kOe] |
|---|---|---|---|
| EI1 | 90Vol% (70mol% (52at%Fe-48at%Pt)-30mol%C)-10Vol% (Polyimide) | 6.4 | 36 |
| EI2 | 90Vol% (70mol% (52at%Fe-48at%Pt)-30mol%C)-10Vol% (Melamine Resin) | 6.2 | 35 |
| EI3 | 90Vol% (70mol% (52at%Fe-48at%Pt)-30mol%C)-10Vol% (Polyethylene) | 6.0 | 34 |
| CE1 | 70mol% (52at%Fe-48at%Pt)-30mol%C | 5.1 | 31 |
| CE2 | 70mol% (52at%Fe-48at%Pt)-30mol%SiO$_2$ | 4.8 | 28 |

MAGNETIC RECORDING MEDIUM, SPUTTERING TARGET, SPUTTERING TARGET MANUFACTURING METHOD, AND MAGNETIC STORAGE APPARATUS

CROSS-REFERENCE TO RELATED APPLICATIONS

This application is based on and claims priority to Japanese Patent Application No. 2017-234838 filed on Dec. 7, 2017, the entire contents of which are incorporated herein by reference.

BACKGROUND OF THE INVENTION

1. Field of the Invention

The present invention relates to a magnetic recording medium, a sputtering target, a sputtering target manufacturing method, and a magnetic storage apparatus.

2. Description of the Related Art

Recently, there are increased demands to increase the recording density of magnetic recording media that are used in the HDDs (Hard Disk Drives) to increase the storage capacity of the HDDs. The heat assisted magnetic recording method is regarded as a promising recording method for further improving the recording density of the magnetic recording media. The heat assisted magnetic recording method uses a magnetic head having a laser light source that irradiates light on the magnetic recording medium, to heat the magnetic recording medium and assist recording.

The heat assisted magnetic recording method can considerably reduce a coercivity of the magnetic recording medium by heating the magnetic recording medium. For this reason, a magnetic material having a high crystal magnetic anisotropy constant Ku may be used for a magnetic layer of the magnetic recording medium. As a result, a crystal grain size of the magnetic material can be made small while maintaining thermal stability of the magnetic recording medium, and the recording density on the order of approximately 1 Tbit/inch$^2$ can be achieved. Alloys proposed for use as the magnetic material having the high crystal magnetic anisotropy constant Ku include ordered alloys such as L1$_0$ FePt alloys, L1$_0$ CoPt alloys, L1$_1$ CoPt alloys, or the like.

In addition, an oxide such as SiO$_2$ or the like, or C or the like, may be added as a material forming a grain boundary phase to isolate the crystal grains of the ordered alloy described above, so as to form a magnetic layer having a granular structure. In this case, it is possible to reduce an exchange coupling between the magnetic grains, and improve a SNR (Signal-to-Noise Ratio).

For example, En Yang et al., "L1$_0$ FePt-oxide columnar perpendicular media with high coercivity and small grain size", Journal of Applied Physics 104, 023904, 2008 proposes adding 38% of SiO$_2$ to FePt.

In addition, Li Zhang et al., "L1$_0$-ordered high coercivity (FePt)Ag—C granular thin films for perpendicular recording", Journal of Magnetism and Magnetic Materials 322, 2010, pp. 2658-2664 proposes (FePt)Ag—C having the granular structure, as a thin film having the L1$_0$ structure and the high coercivity.

The heat assisted magnetic recording method uses laser light or the like to locally heat the magnetic layer of the magnetic recording medium and reduce the coercivity of the heated part. In principle, the heat assisted magnetic recording method may achieve its goal by heating only one recording bit.

However, in the actual magnetic recording medium, heat spreads in a lateral direction of the magnetic layer adjacent to the recording bit, and consequently, a bit adjacent to the recording bit is also heated. In addition, because an underlayer, a substrate, or the like are arranged under the magnetic layer, the heat also spreads in a downward direction of the magnetic layer. Particularly when the heat spreads in the lateral direction of the magnetic layer, a magnetic transition region in an in-plane direction of the magnetic layer is enlarged. As a result, a so-called side-erase is easily generated, to deteriorate the SNR of the magnetic recording medium.

SUMMARY OF THE INVENTION

Embodiments of the present invention can provide a magnetic recording medium having a high SNR, a magnetic storage apparatus including the magnetic recording medium, a sputtering target for use in sputtering a magnetic layer of the magnetic recording medium, a sputtering target manufacturing method that manufactures the sputtering target for use in sputtering the magnetic layer of the magnetic recording medium.

According to one aspect of embodiments of the present invention, a magnetic recording medium includes a substrate; an underlayer provided on the substrate; and a magnetic layer provided on the underlayer and having a L1$_0$ structure and a (001) orientation, wherein the magnetic layer has a granular structure in which an organic compound having a methylene skeleton or a methine skeleton is arranged at grain boundaries of magnetic grains.

According to another aspect of the embodiments of the present invention, a magnetic storage apparatus includes a magnetic recording medium described above; and a magnetic head configured to record signals on and reproduce signals from the magnetic recording medium according to a heat assisted magnetic recording method.

According to still another aspect of the embodiments of the present invention, a sputtering target for use in sputtering a magnetic layer, includes a nitrogen-including organic compound; and a magnetic material, wherein the nitrogen-including organic compound is selected from a group consisting of polyimide, melamine resin, and a compound including an amide linkage or an urethane linkage, and wherein a content of the nitrogen-including organic compound is 0.5 vol % or greater and 40 vol % or less.

According to a further aspect of the embodiments of the present invention, a method of manufacturing a sputtering target for use in sputtering a magnetic layer, includes sintering a composition that includes a precursor of a nitrogen-including organic compound, and magnetic powder, wherein the nitrogen-including organic compound is selected from a group consisting of polyimide, melamine resin, and a compound including an amide linkage or an urethane linkage.

Other objects and further features of the present invention will be apparent from the following detailed description when read in conjunction with the accompanying drawings.

BRIEF DESCRIPTION OF THE DRAWINGS

FIG. 4 is a diagram illustrating measured results of SNR and coercivity of magnetic recording media.

DESCRIPTION OF THE PREFERRED EMBODIMENTS

Figure 1:
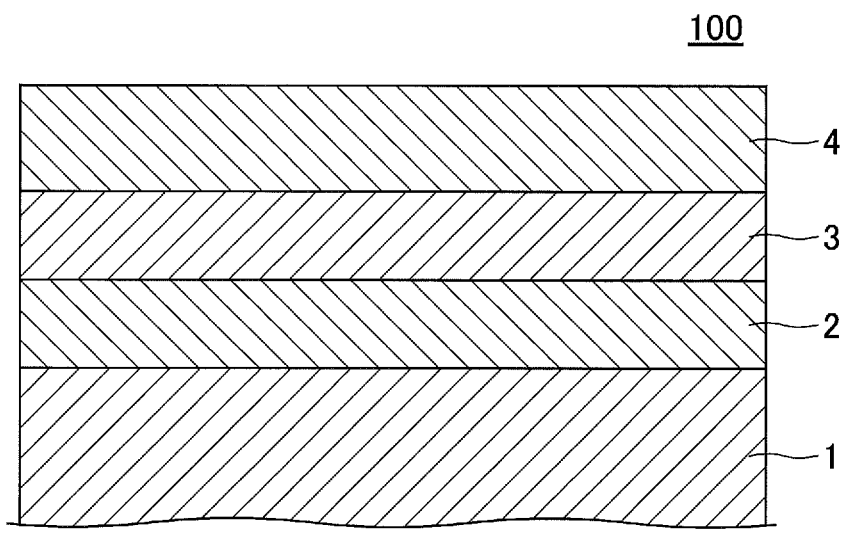
FIG. 1 is a cross sectional view schematically illustrating an example of a magnetic recording medium in one embodiment.

Embodiments and exemplary implementations of a magnetic recording medium, a sputtering target, a sputtering target manufacturing method, and a magnetic storage apparatus according to the present invention will be described, by referring to the drawings.

FIG. 1 is a cross sectional view schematically illustrating an example of a magnetic recording medium in one embodiment.

A magnetic recording medium 100 illustrated in FIG. 1 includes a substrate 1, an underlayer 2, a magnetic layer 3, and a protection layer 4 that are successively stacked in this order. The magnetic layer 3 has a $L1_0$ structure and a (001) orientation. The magnetic layer 3 gas a granular structure in which an organic compound having a methylene skeleton or a methine skeleton is arranged at grain boundaries of magnetic grains. The protection layer 4 includes DLC (Diamond-Like Carbon).

Thermal insulating properties between adjacent magnetic grains of the magnetic layer 3 can be improved, because the magnetic layer 3 has the structure described above. As a result, when laser light is emitted from a magnetic head and irradiated on the magnetic recording medium 100, heat uneasily spreads in a lateral direction of the magnetic layer 3. Hence, a side-erase is uneasily generated, and a high SNR can be achieved.

In this specification and claims, the "methylene skeleton" refers to two skeletons represented by the following chemical formula.

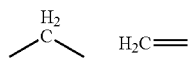

In addition, the "methine skeleton" refers to two skeletons represented by the following chemical formula.

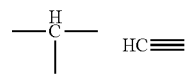

The organic compound having the methylene skeleton or the methine skeleton is not limited to a particular organic compound, and may include polyimide, melamine resin, polyethylene, or the like.

Particular examples of the polyethylene include high-density polyethylene, medium-density polyethylene, low-density polyethylene, or the like, and the polyethylene may include two or more kinds of polyethylene.

When the magnetic layer 3 has the structure described above, it may be regarded that the thermal insulating properties between adjacent magnetic grains of the magnetic layer 3 can be improved for the reasons explained below.

In a magnetic layer having a conventional granular structure, an inorganic compound such as carbon, carbide, oxide, nitride, or the like is arranged at the grain boundaries of the magnetic grains. For example, silicon dioxide ($SiO_2$) has a thermal conductivity of 1700 W/(m·k), and carbon (or graphite) has a thermal conductivity of 1.4 W/(m·k). On the other hand, polyimide, melamine resin, and low-density polyethylene have thermal conductivities of approximately 0.16 W/(m·k), approximately 0.04 W/(m·k), and approximately 0.33 W/(m·k), respectively. In other words, the organic compounds having the methylene skeleton or the methine skeleton have thermal conductivities that are extremely low compared to the thermal conductivities of the inorganic compounds. For this reason, it may be regarded that, in the magnetic recording medium 100, heat uneasily spreads in the lateral direction of the magnetic layer 3, that is, between the adjacent magnetic grains.

The organic compounds having the methylene skeleton or the methine skeleton preferably have a low thermal conductivity. More particularly, the organic compounds having the methylene skeleton or the methine skeleton preferably have a thermal conductivity lower than one-half the thermal conductivity of $SiO_2$, that is, 0.7 W/(m·k) or lower.

The organic compounds having the methylene skeleton or the methine skeleton have a high melting point and a high hardness. Hence, the organic compounds having the methylene skeleton or the methine skeleton preferably are nitrogen-including organic compounds, and more preferably are polyimide, melamine resin, or a compound including an amide linkage or an urethane linkage.

The polyimide is not limited to a particular polyimide, and may be a polycondensate of tetracarboxylic dianhydride and diamine, where the tetracarboxylic dianhydride includes pyromellitic dianhydride, 3,3',4,4'-diphenyl-tetracarboxylic dianhydride, 3,3',4,4'-benzophenone-tetracarboxylic dianhydride, 3,3',4,4'-diphenylether-tetracarboxylic dianhydride, or the like, and the diamine includes 1,4-phenylenediamine, 4,4'-diaminodiphenylether, 4,4'-biphenyldiamine, or the like. The polyimide may include two or more kinds of polycondensates.

The melamine resin is not limited to a particular melamine resin, and may be a polycondensate of melamine and formaldehyde, a polycondensate of 2-substituted melamine and formaldehyde, or the like, where the 2-substituted melamine includes a substitution by a substituent group such as methylol group, an alkyl group, a phenyl group, or the like. The melamine resin may include two or more kinds of such polycondensates.

The compound having the amide linkage is not limited to a particular compound, and may be a polyamide such as nylon 6, nylon 66, or the like. The compound having the amide linkage may include two or more kinds of such polyamides.

The compound having the urethane linkage is not limited to a particular compound, and may be an urethane resin that is a polycondensate of aromatic polyol or aliphatic polyol and polyisocyanate, or the like. The compound having the urethane linkage may include two or more kinds of such urethane resins.

The magnetic layer 3 may be formed by sputtering. A sputtering target used to form the magnetic layer 3 includes the organic compound having the methylene skeleton or the methine skeleton, and a content of 0.5 vol % or greater and 40 vol % or less.

When forming the magnetic layer 3, it is preferable to use a RF (Radio-Frequency) sputtering, in order to reduce a temperature rise of the sputtering target. In this case, it is possible to reduce decomposition of the organic compound having the methylene skeleton or the methine skeleton. Further, it is also possible to use a sputtering target having a low electrical conductivity.

The sputtering target used to form the magnetic layer 3 may be manufactured by sintering a composition that includes an organic compound (or precursor thereof) including the methylene skeleton or the methine skeleton, and magnetic powder. In a case in which the precursor of the organic compound of the methylene skeleton or the methine skeleton is used, the precursor reacts to generate the organic compound having the methylene skeleton or the methine skeleton, to increase a sintered density to a high density. When the sintered density of the sputtering target is low, sputtering dust may be generated, or a difference between a composition of the magnetic layer and the sputtering target may become large, due to abnormal discharge generated during the sputtering.

A content of the organic compound having the methylene skeleton or the methine skeleton in the magnetic layer 3 is preferably 0.5 vol % or greater and 40 vol % or less. When the content of the organic compound having the methylene skeleton or the methine skeleton in the magnetic layer 3 is 0.5 vol % or greater, the thermal insulating properties between the adjacent magnetic grains of the magnetic layer 3 improve. When the content of the organic compound having the methylene skeleton or the methine skeleton in the magnetic layer 3 is 40 vol % or less, a volume of the magnetic grain per 1 bit increases, to improve the thermal stability (or reduce a thermal instability) of the magnetic recording medium 100.

A thickness of the magnetic layer 3 is preferably 1 nm or greater and 7 nm or less, and more preferably 1.5 nm or greater and 5.5 nm or less. When the thickness of the magnetic layer 3 is 1 nm or greater and 7 nm or less, it is possible to improve the (001) orientation and the ordering of the magnetic layer 3 having the $L1_0$ structure. In addition, it is possible to improve the thermal insulating properties between the adjacent magnetic grains of the magnetic layer 3 having the granular structure.

The magnetic grains preferably include a FePt alloy or a CoPt alloy. In this case, a crystal magnetic anisotropy constant Ku of the magnetic grains can be set to a high value.

The substrate 1 may be made of any suitable substrate, including a known substrate. When manufacturing the magnetic recording medium 100, the substrate 1 may be required to be heated to a temperature of 500° C. or higher. For this reason, the substrate 1 has a softening temperature of 500° C., for example. A heat-resistant glass substrate having a softening temperature of 600° C. or higher, for example, may preferably be used as the substrate 1.

A material forming the underlayer 2 is not limited to a particular material, as long as the material is suited for causing the (001) orientation of the magnetic layer 3 having the $L1_0$ structure. For example, materials such as W, MgO, or the like having a (100) orientation may be used for the underlayer 2.

The underlayer 2 may have a multi-layer structure. In this case, a lattice misfit (or mismatch) among a plurality of layers forming the multi-layer structure of the underlayer 2 is preferably 10% or less. The plurality of layers forming the underlayer 2 having the multi-layer structure may be made of the materials such as W, MgO, or the like having the (100) orientation.

In order to positively cause the underlayer 2 to have the (100) orientation, a layer including one of Cr, an alloy including Cr and having a BCC (Body-Centered Cubic) structure, and an alloy having a B2 structure, may further be provided under the underlayer 2. In this case, examples of the alloy including Cr and having the BCC structure include CrMn, CrMo, CrW, CrV, CrTi, CrRu, or the like, for example. In addition, examples of the alloy having the B2 structure include RuAl, NiAl, or the like, for example.

In the magnetic recording medium 100, the protection layer 4 is formed on the magnetic layer 3. However, the protection layer 4 may be omitted.

A method of forming the protection layer 4 is not limited to a particular method. For example, a RF-CVD (Chemical Vapor Deposition) that decomposes a source gas made of hydrocarbon by high-frequency plasma, an IBD (Ion Beam Deposition) that ionizes the source gas by electrons emitted from a filament, a FCVA (Filtered Cathodic Vacuum Arc) that uses a solid carbon target without using a source gas, or the like may be used to form the protection layer 4.

A thickness of the protection layer 4 is not limited to a particular value, but is preferably 1 nm or greater and 6 nm or less, for example. The floating properties of the magnetic head become satisfactory when the thickness of the protection layer 4 is 1 nm or greater. In addition, a magnetic spacing becomes small and the SNR improves when the thickness of the protection layer 4 is 6 nm or less.

A lubricant layer made of a fluororesin, such as a perfluoropolyether resin, may be formed on the protection layer 4.

A magnetic storage apparatus in one embodiment is not limited to a particular structure, as long as the magnetic storage apparatus includes the magnetic recording medium 100 in this embodiment. As will be described later, the magnetic storage apparatus includes a medium drive part, the magnetic head, a head drive part, and a signal processing device. The medium drive part drives and rotates the magnetic recording medium having a disk shape, for example. The magnetic head has a tip end part provided with a near-field light generating element. The magnetic head further includes a laser light generator that heats the magnetic recording medium, and a waveguide that guides laser light generated from the laser light generator to the near-field light generating element. The head drive part drives and moves the magnetic head relative to the magnetic recording medium. The signal processing device processes signals to be recorded on the magnetic recording medium by the magnetic head, and signals reproduced from the magnetic recording medium by the magnetic head.

Figure 2:
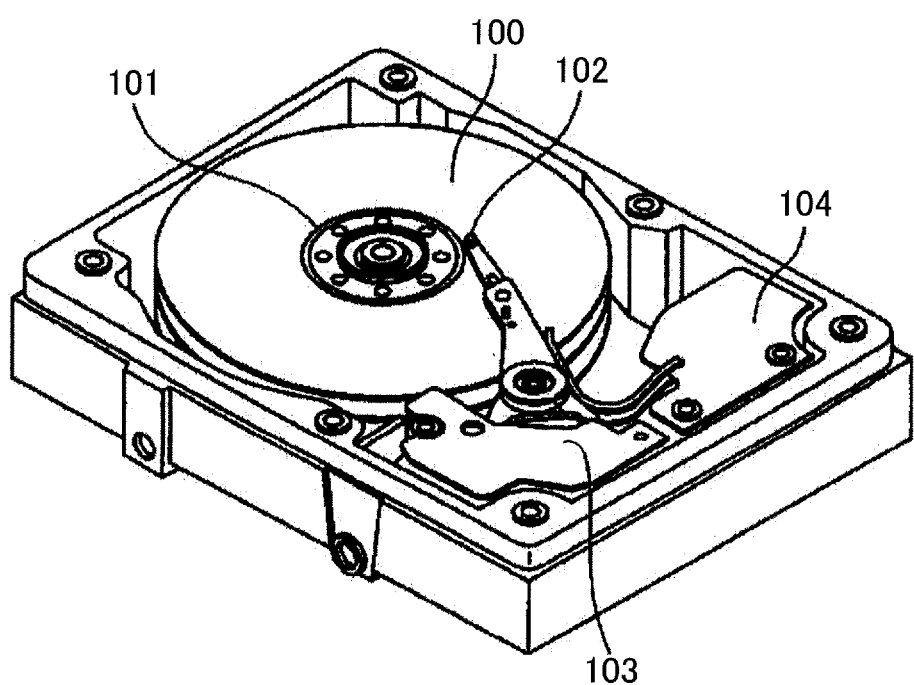
FIG. 2 is a perspective view schematically illustrating an example of a magnetic storage apparatus in one embodiment.

FIG. 2 is a perspective view schematically illustrating an example of the magnetic storage apparatus in one embodiment. The magnetic storage apparatus illustrated in FIG. 2 includes at least one magnetic recording medium 100, a medium drive part 101 that drives and rotates the magnetic recording medium 100, a magnetic head 102, a head drive part 103 that drives and moves the magnetic head 102 relative to the magnetic recording medium 100, and a signal processing device 104.

Figure 3:
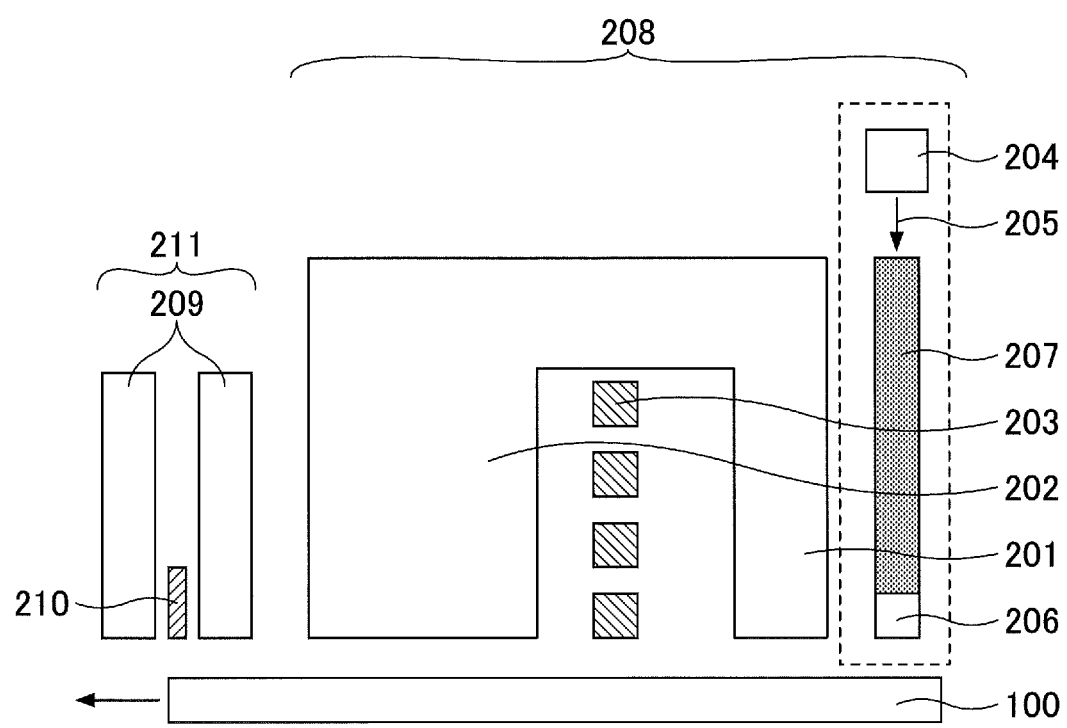
FIG. 3 is a diagram schematically illustrating an example of a magnetic head illustrated in FIG. 2.

FIG. 3 is a diagram schematically illustrating an example of the magnetic head illustrated in FIG. 2. The magnetic head 102 illustrated in FIG. 3 includes a recording head 208, and a reproducing head 211.

The recording head 208 includes a main magnetic pole 201, an auxiliary magnetic pole 202, a coil 203 that generates a magnetic field, a laser diode 204 that forms a laser light generator, and a waveguide 207 that guides laser light 205 generated from the laser diode 204 to a near-field light generating element 206. The reproducing head 211 includes a reproducing element 210 sandwiched between shields 209.

The reproducing head 211 includes a reproducing element 210 sandwiched between shields 209.

Next, exemplary implementations will be described to further clarify advantageous features of the embodiments of the present invention.

[Manufacturing Sputtering Target ST1]

A sputtering target ST1 with a composition of 90 vol % (70 mol % (52 at % Fe-48 at % Pt)-30 mol % C)-10 vol % (polyimide) was manufactured by a manufacturing method described hereunder.

First, FePt alloy powder having a composition of 52 at % Fe-48 at % Pt was obtained using a gas atomization method. The FePt alloy powder had an average grain diameter of 15 μm.

The FePt alloy powder, carbon grains having an average grain diameter of 15 μm, and polyamic acid U-varnish S manufactured by Ube Industries, Ltd. that is used as a polyamide precursor are mixed at ratios described above, and thereafter kneaded to obtain a paste.

After coating the paste on a copper plate having a diameter of 200 mm by a spin coater to a thickness of 2 mm, the coated paste was vacuum-dried. Next, using an oven, the dried paste was heated at 200° C. for one hour, and thereafter heated at 270° C. for one hour, to obtain the sputtering target ST1. In this state, the polyamic acid had been dehydrated into polyimide.

[Manufacturing Sputtering Target ST2]

A sputtering target ST2 with a composition of 90 vol % (70 mol % (52 at % Fe-48 at % Pt)-30 mol % C)-10 vol % (melamine resin) was manufactured by a manufacturing method described hereunder.

First, FePt alloy powder having a composition of 52 at % Fe-48 at % Pt was obtained using the gas atomization method. The FePt alloy powder had an average grain diameter of 15 μm.

The FePt alloy powder, carbon grains having an average grain diameter of 15 μm, and methylol melamine that is used as a melamine resin precursor are mixed at ratios described above, and thereafter kneaded to obtain a paste.

After coating the paste on the copper plate having the diameter of 200 mm by the spin coater to a thickness of 2 mm, the coated paste was vacuum-dried. Next, using the oven, the dried paste was heated at 150° C. for one hour, and thereafter heated at 200° C. for one hour, to obtain the sputtering target ST2. In this state, the methylol melamine had been polycondensated into melamine resin.

[Manufacturing Sputtering Target ST3]

A sputtering target ST3 with a composition of 90 vol % (70 mol % (52 at % Fe-48 at % Pt)-30 mol % C)-10 vol % (polyethylene) was manufactured by a manufacturing method described hereunder.

First, FePt alloy powder having a composition of 52 at % Fe-48 at % Pt was obtained using the gas atomization method. The FePt alloy powder had an average grain diameter of 15 μm.

The FePt alloy powder, carbon grains having an average grain diameter of 15 μm, and low-density polyethylene "HI-WAX (registered trademark) 410P" manufactured by Mitsui Chemicals, Inc. are mixed at ratios described above, and thereafter kneaded at 130° C. to obtain a kneaded material.

After coating the kneaded material on the copper plate having the diameter of 200 mm by a roll coater at 130° C. to a thickness of 2 mm, the coated kneaded material was vacuum-dried. Next, using the oven, the dried kneaded material was heated at 270° C. for two hours, to obtain the sputtering target ST3.

[Exemplary Implementation EI1]

First, an underlayer was deposited on a glass substrate having a diameter of 2.5 inches (hereinafter also referred to as a "2.5-inch glass substrate"). More particularly, a 50Co-50Ti layer having a thickness of 50 nm was deposited on the 2.5-inch glass substrate, as a first underlayer, and the glass substrate was thereafter heated at 300° C., where the "50Co-50Ti layer" represents a layer made of an alloy of 50 at % Co and 50 at % Ti, and similar representations are used hereinafter. Next, a 80Cr-20V layer having a thickness of 12 nm was deposited as a second underlayer. Further, a W layer having a thickness of 40 nm was deposited as a third underlayer, and a MgO layer having a thickness of 3 nm was deposited as a fourth underlayer. A DC magnetron sputtering apparatus was used to deposit the first through fourth underlayers by sputtering, and Ar was used as a sputtering gas.

Thereafter, the glass substrate was heated at 520° C. Next, a magnetic layer having a thickness of 2 nm was deposited on the underlayer (including the first through fourth underlayers), using a RF sputtering apparatus and the sputtering target ST1. In this case, AR gas used as a sputtering gas. Then, a temperature of the glass substrate was controlled to 480° C.

A FT-IR (Fourier Transform-Infrared) spectroscopic analysis of the magnetic layer was made. It was confirmed from results of the FT-IR spectroscopic analysis that a signal caused by the methylene skeleton or the methine skeleton is observed in a vicinity of 1100 $cm^{-1}$, and that polyimide is included in the magnetic layer. From an intensity of the signal caused by the methylene skeleton or the methine skeleton, it was estimated that a polyimide-content of the magnetic layer is approximately 3 vol %.

Thereafter, a protection layer made of DLC and having a thickness of 3 nm was formed on the magnetic layer. A lubricant layer made of a fluororesin, such as a perfluoropolyether resin, was famed on the protection layer to a thickness of 1.2 nm, to complete the magnetic recording medium of an exemplary implementation EI1.

An X-ray diffraction analysis of the magnetic recording medium was made. It was confirmed from results of the X-ray diffraction analysis that the underlayer has the BCC structure and the (100) orientation, and that the magnetic layer has the $L1_0$ structure and the (001) orientation.

[Exemplary Implementation EI2]

The magnetic recording medium of an exemplary implementation EI2 was manufactured similarly to the magnetic recording medium of the exemplary implementation EI1, except that the sputtering target ST2 was used in place of the sputtering target ST1.

A FT-IR spectroscopic analysis of the magnetic layer was made. It was confirmed from results of the FT-IR spectroscopic analysis that a signal caused by the melamine resin is observed in a vicinity of 1500 $cm^{-1}$, and that the melamine resin is included in the magnetic layer. From the intensity of the signal caused by the melamine resin, it was estimated that a melamine-resin-content of the magnetic layer is approximately 2 vol %.

An X-ray diffraction analysis of the magnetic recording medium was made. It was confirmed from results of the X-ray diffraction analysis that the underlayer has the BCC structure and the (100) orientation, and that the magnetic layer has the $L1_0$ structure and the (001) orientation.

[Exemplary Implementation EI3]

The magnetic recording medium of an exemplary implementation EI3 was manufactured similarly to the magnetic recording medium of the exemplary implementation EI1, except that the sputtering target ST3 was used in place of the sputtering target ST1.

A FT-IR spectroscopic analysis of the magnetic layer was made. It was confirmed from results of the FT-IR spectroscopic analysis that a signal caused by the polyethylene is observed in a vicinity of 1450 cm$^{-1}$, and that the polyethylene is included in the magnetic layer. From the intensity of the signal caused by the polyethylene, it was estimated that a polyethylene-content of the magnetic layer is approximately 2 vol %.

An X-ray diffraction analysis of the magnetic recording medium was made. It was confirmed from results of the X-ray diffraction analysis that the underlayer has the BCC structure and the (100) orientation, and that the magnetic layer has the $L1_0$ structure and the (001) orientation.

[Comparison Examples CE1 and CE2]

The magnetic recording medium of each of comparison examples CE1 and CE2 was manufactured similarly to the magnetic recording medium of the exemplary implementation EI1, except for the composition of the magnetic layer that is different from that of the exemplary implementation EI1, as illustrated in FIG. 4. FIG. 4 is a diagram illustrating measured results of SNR and coercivity of the magnetic recording media.

An X-ray diffraction analysis of the magnetic recording medium of each of the comparison examples CE1 and CE2 was made. It was confirmed from results of the X-ray diffraction analysis that the underlayer has the BCC structure and the (100) orientation, and that the magnetic layer has the $L1_0$ structure and the (001) orientation, for each of the comparison examples CE1 and CE2.

Next, the SNR and the coercivity were measured for the magnetic recording medium of each of the exemplary implementations EI1, EI2, and EI3, and the comparison examples CE1 and CE2.

The magnetic head 102 illustrated in FIG. 3 was used to measure the SNR of each magnetic recording medium.

A magnetization curve measurement system that uses the Kerr effect, manufactured by Neoark Corporation, was used to measure the coercivity Hc of each magnetic recording medium.

Results of the SNR and the coercivity Hc measured for each magnetic recording medium is illustrated in FIG. 4. From the measured results illustrated in FIG. 4, it was confirmed that the magnetic recording media of the exemplary implementations EI1, EI2, and EI3 can obtain high SNR and high coercivity Hc.

On the other hand, it was confirmed from the measured results illustrated in FIG. 4 that the SNR and the coercivity Hc obtainable by the magnetic recording media of the comparison examples CE1 and CE2 are low compared to those of the exemplary implementations EI1, EI2, and EI3, because the organic compound having the methylene skeleton or the methine skeleton does not exist at the grain boundaries of the magnetic grains in the magnetic recording media of the comparison examples CE1 and CE2.

According to the embodiments and the exemplary implementations described above, it is possible to provide a magnetic recording medium having a high SNR. It is also possible to provide a magnetic recording medium having a high coercivity Hc.

Although the exemplary implementations are numbered with, for example, "first," "second," "third," etc., the ordinal numbers do not imply priorities of the exemplary implementations.

Further, the present invention is not limited to these embodiments and exemplary implementations, but various variations and modifications may be made without departing from the scope of the present invention.

What is claimed is:

1. A magnetic recording medium comprising:
a substrate;
an underlayer provided on the substrate; and
a magnetic layer, provided on the underlayer, and having a $L1_0$ structure and a (001) orientation caused by the underlayer,
wherein the magnetic layer has a granular structure in which an organic compound having a first skeleton or a second skeleton is arranged at grain boundaries of magnetic grains,
wherein the first skeleton refers to skeletons represented by

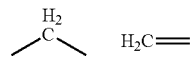

and the second skeleton refers to skeletons represented by

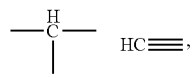

and
wherein the organic compound is a nitrogen-including organic compound selected from a group consisting of melamine resin, and a compound including an amide linkage or an urethane linkage.

2. The magnetic recording medium as claimed in claim 1, wherein a content of the organic compound having the first skeleton or the second skeleton in the magnetic layer is 0.5 vol % or greater and 40 vol % or less.

3. The magnetic recording medium as claimed in claim 1, wherein the magnetic layer has a thickness of 1 nm or greater and 7 nm or less.

4. The magnetic recording medium as claimed in claim 1, wherein the magnetic grains include an FePt alloy or a CoPt alloy.

5. The magnetic recording medium as claimed in claim 3, wherein the magnetic grains include an FePt alloy or a CoPt alloy.

6. A magnetic storage apparatus comprising:
a magnetic recording medium according to claim 1; and
a magnetic head configured to record signals on and reproduce signals from the magnetic recording medium according to a heat assisted magnetic recording method.

7. The magnetic recording medium as claimed in claim 1, wherein the organic compound having the first skeleton or the second skeleton has a thermal conductivity of 0.7 W/(m·k) or lower.

8. A magnetic recording medium comprising:
a substrate;
an underlayer provided on the substrate; and
a magnetic layer provided on the underlayer and having a $L1_0$ structure and a (001) orientation caused by the underlayer,
wherein the magnetic layer has a granular structure in which a nitrogen-including organic compound having a first skeleton or a second skeleton is arranged at grain boundaries of magnetic grains,
wherein the first skeleton refers to skeletons represented by

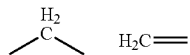

and the second skeleton refers to skeletons represented by

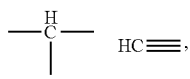

wherein a content of the nitrogen-including organic compound having the first skeleton or the second skeleton in the magnetic layer is 0.5 vol % or greater and 40 vol % or less, and
wherein the nitrogen-including organic compound is polyimide.

9. The magnetic recording medium as claimed in claim 8, wherein the nitrogen-including organic compound having the first skeleton or the second skeleton has a thermal conductivity of 0.7 W/(m·k) or lower.

\* \* \* \* \*